Figures 1, 3:
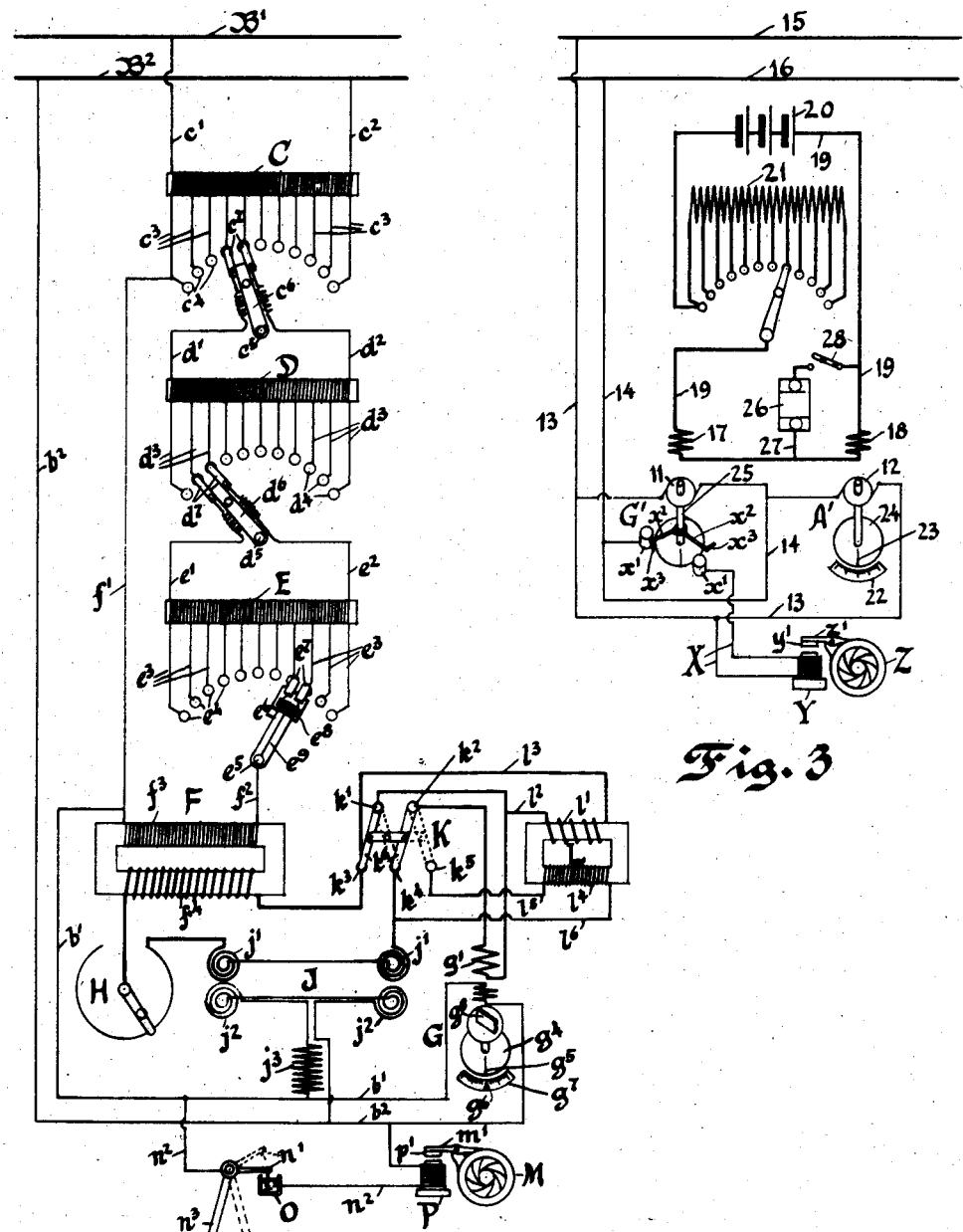

E. M. WILKINS.
PROCESS AND APPARATUS FOR TESTING WATTMETERS.
APPLICATION FILED AUG. 12, 1907.

905,966.

Patented Dec. 8, 1908.
2 SHEETS—SHEET 1.

E. M. Wilkins, Inventor

Witnesses

By Edward P. Thompson, Attorney

UNITED STATES PATENT OFFICE.

EDGAR M. WILKINS, OF MEXICO, MEXICO.

PROCESS AND APPARATUS FOR TESTING WATTMETERS.

No. 905,966.   Specification of Letters Patent.   Patented Dec. 8, 1908.

Application filed August 12, 1907. Serial No. 388,474.

*To all whom it may concern:*

Be it known that I, EDGAR M. WILKINS, of Mexico city, Mexico, have invented a Process and Apparatus for Testing Wattmeters, of which the following is a specification.

The invention relates to an improved method for calibrating or standardizing service meters such as are used on electric circuits, although it is possible that the invention herein disclosed may also be found applicable to the calibration or standardization of other meters. The type of meter here more particularly had in mind, however, and with relation to which the present invention is described, is that known as the integrating wattmeter of the induction type (being in reality a watt-hour meter), which type consists, as is well understood, of a motor whose rotor consists of an aluminum disk mounted to rotate on a spindle and actuated by the combined action of the potential and current flux of the stator, and retarded by the flux of a permanent magnet. My invention may also be applied, however, to the commutating type of meter used on direct current circuits.

The object of my present invention is to provide a method both more accurate and also very much more rapid than in common use for standardizing meters and adjusting them to accuracy.

It is well known that meters of different types, different manufacture or different capacity have correspondingly different characteristics, and hence give different registration for the same load or for variations from the normal of the voltage, frequency or temperature. This has been fully explained, for example, in a paper by William Bradshaw on "The Maintenance and Calibration of Service Meters," published in the proceedings of the National Electric Light Association for 1906. Because of the fact that the rate of registration of a meter is not strictly proportional to the load upon it for all loads, but in general only for two loads for a given setting, it is desirable, not merely to set a meter to register correctly one load, say full load, but also to test its registration at one or more other loads, in particular a very light load at which the meter is liable to vary more widely from the normal.

My method consists briefly in two steps, namely, first, in calibrating a secondary standard integrating meter, preferably of the same type as the service meters to be standardized, by comparison with a Kelvin balance to measure the watts and a time measurer such as a pendulum having a period equal to the correct period of rotation of the meter when loaded to the test load; and secondly, comparison of the said secondary standard when thus calibrated with the service meters by means of a special method to be hereinafter described. Both steps involve as an essential element of the invention the observation during rotation of a spot or mark upon the meter disk by means of instantaneous presentation to the eye, which may be accomplished in various ways, as by an electrically operated photographic shutter or a revolving mirror, which arrangements will be hereinafter described in detail. As now manufactured all integrating meters have a disk or cylinder on which a spot of paint is put for counting the revolutions.

Figure 2:
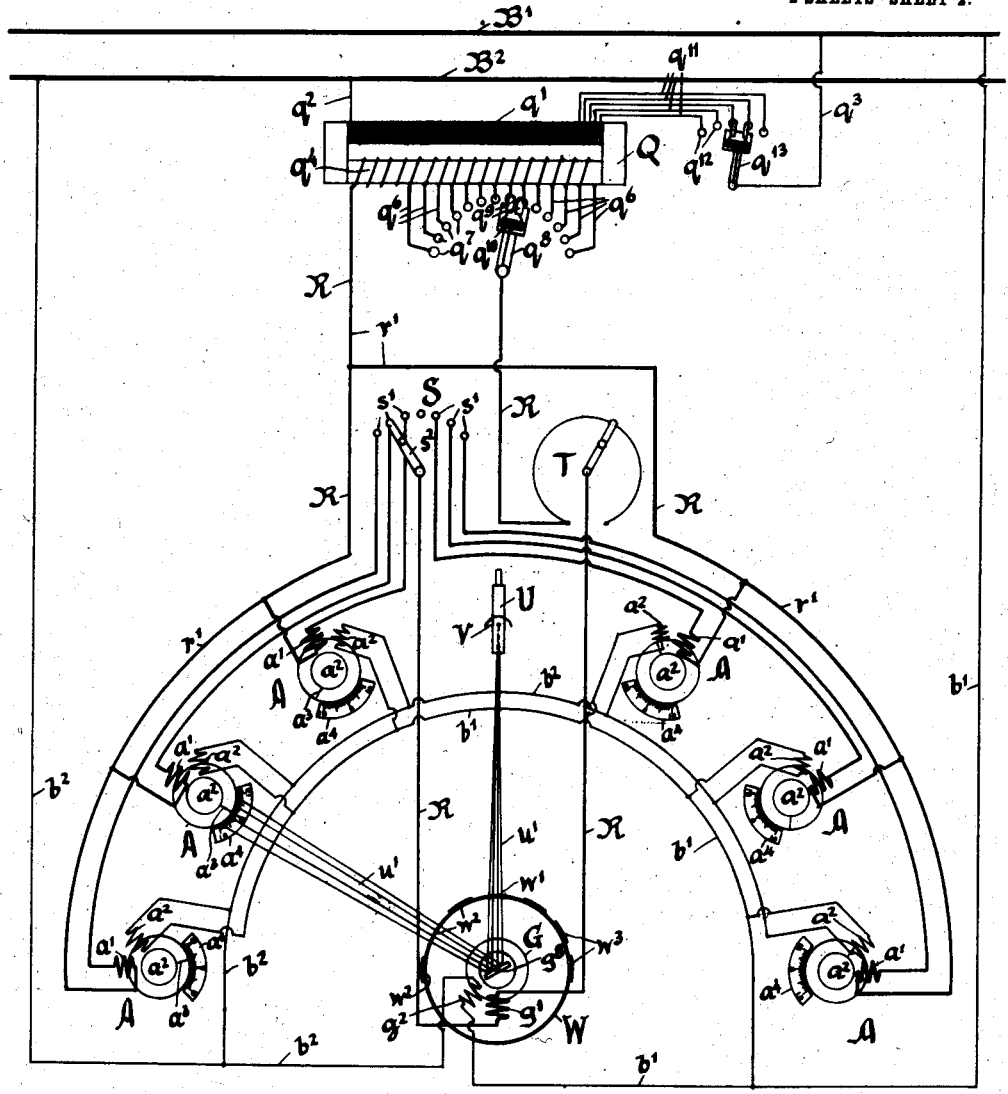

The principles of my invention are well and clearly illustrated in the accompanying drawings, wherein Figure 1 illustrates diagrammatically the arrangement of the elements and electrical connections for standardizing a rotating-meter for alternating current by means of the pendulum and Kelvin balance; Fig. 2 shows diagrammatically the arrangement of the parts and electrical connections for standardizing simultaneously or successively a number of alternating current service meters by means of a secondary standard, or standardized rotating-meter; and Fig. 3 illustrates an alternative method for performing this calibration or standardization, this diagram showing also the method as applied to direct current meters.

In these drawings every reference numeral and letter refers always to the same part.

In Fig. 1, as well as in the Fig. 2, the characters $B'$ and $B^2$ designate the bus-bars or main conductors of an electric circuit carrying alternating current. Across these bus-bars or mains are connected the terminals $c'$ and $c^2$ of an autotransformer C, which is divided into a plurality of preferably equal segments by means of taps $c^3$ brought down to a set of contact-bosses $c^4$ disposed circularly about the pivot $c^5$ of a contact-lever $c^6$ which has two contact-fingers $c^7$ spaced at a distance equal to that between two adjacent bosses $c^4$, whereby said fingers always rest upon two adjacent bosses respectively. The fingers $c^7$ are insulated from one another and connected respectively with terminals $d'$, $d^2$, of a second autotransformer D which in like manner is provided with a plurality of equidistant taps $d^3$, brought down to contact-bosses $d^4$ disposed circularly about the pivot $d^5$ of a contact-lever $d^6$, which like the lever $c^6$ is provided with two insulated contact-fingers $d^7$, spaced so as simultaneously to contact with two adjacent bosses $d^4$. The fingers $d^7$ are in turn connected with the terminals $e'$, $e^2$, of a third autotransformer E, which is also provided with a plurality of equidistant taps $e^3$, in like manner connected to the respective contact-bosses $e^4$ which are disposed circularly about the pivot $e^5$ of a contact-lever $e^6$, which latter carries a pair of contact-fingers $e^7$ so disposed as to contact simultaneously with two adjacent bosses $e^4$ as shown, and so that in sliding along the bosses $e^4$ one of the fingers is always in contact with one of said bosses. The fingers $e^7$ are connected to the ends of an inductive resistance or choke-coil $e^8$, the center of which is connected by a lead $e^9$ to the pivot $e^5$. The choke-coil $e^8$ prevents the segment between the taps $e^3$ covered by the fingers $e^7$ from being short-circuited, while at the same time not interfering with the flow of current in the lead $e^9$. If, instead of this arrangement, a single contact-finger on the lever $e^6$ were employed, the shifting of the lever would necessitate either breaking the circuit between bosses or short-circuiting the segments of the transformer E, both of which are very objectionable; but with this arrangement both these contingencies are prevented.

The pivot $e^5$ of the lever $e^6$ is electrically connected by a conductor $f^2$ to one pole of the high-tension primary $f^3$ of a transformer F, the pole $f'$ of said primary being connected directly to the pole or bus-bar B' of the circuit, as shown. It will be seen that this combination of autotransformers in cascade forms a means of adjusting very closely the total electromotive force applied to the terminals of the primary $f^3$. For example, if, as shown in the drawing, the autotransformers C, D, and E are each divided into ten equal steps or segments, an adjustment of voltage applied to F can be made to one-thousandth part of that between the bus-bars B', B². Ordinarily, however, it would not be necessary to use more than two autotransformers in cascade, these being divided into a greater number of steps so as to obtain a sufficiently close regulation.

The purpose of the transformer F is to provide a full-load circuit for the standardizing-meter G so that it may be tested at full load without unnecessary power-consumption. The low-tension secondary $f^4$ of said transformer will, therefore, give a potential of only a few volts. The current-circuit or load-circuit for testing includes, besides the secondary $f^4$ of the transformer F, a continuously variable rheostat H; the current coils $j'$ of the Kelvin balance J; and the current-coil $g'$ of the meter G; all of which are connected in series as shown; but between the meter-coil $g'$ and the other elements of the circuit is inserted a double-throw or change-over switch K. The terminals $k'$, $k^2$, of the switch K are connected to the respective poles of the coil $g'$, and are connectible alternatively to the terminals $k^3$ and $k^4$, and $k^5$, according as the blades $k^6$ of the switch are thrown to the left or to the right. When thrown to the left the transformer F, rheostat H, balance coils $j'$, and meter coil $g'$, are all connected together in series by the switch K, as shown. A small secondary transformer L with a transformation ratio of ten to one has its low-tension primary $l'$ connected by leads $l^2$, $l^3$, to the terminals $k'$ and $k^3$ respectively of the switch K; while the terminals of the high-tension secondary $l^4$, of said transformer are connected by leads $l^5$, and $l^6$ with the terminals $k^4$ and $k^5$ of the switch K. It will be seen that the transformer L is out of action in the left-hand position of the switch K, its primary then being short-circuited and its secondary open-circuited; but on throwing the switch to the right, direct connection between the meter-coil $g'$ and the primary-circuit is cut off, this circuit being then completed through the primary of the transformer L, while the meter-circuit is completed from the secondary $l^4$ of the transformer L, through the leads $l^5$, and $l^6$, the terminals $k^4$ and $k^5$, switch-blades $k^6$, the terminals $k^1$ and $k^2$, and thence through the meter-coil $g'$. The effect of this is to give a current or load upon the meter in the right-hand position of the switch K only one-tenth of that which it has in the left-hand position, while the adjustment of the balance J is undisturbed. The potential coils $j^2$ of the Kelvin balance are, of course, connected through the usual resistance, across the poles of the circuit, through the secondary leads $b'$ and $b^2$, to the respective conductors B' and B²; and the potential coil $g^2$ of the meter G are in like manner connected across the poles of the circuit as shown.

The shaft $g^3$ of the meter G bears the usual copper-disk $g^4$, and on the periphery of this disk is placed a spot or mark $g^5$ (this mark is generally put on by the manufacturers) which is observed at intervals corresponding to one complete rotation, through a photographic shutter M, which is set to what is called the instantaneous exposure, the length of which is so short as to show the rotating-spot $g^5$ substantially only in one position. For comparison's sake a fixed spot or mark $g^6$ is placed adjacent to the periphery of the disk $g^4$, and may or may not be accompanied by a graduated arc $g^7$. The graduations on the arc $g^7$, when used, should represent 3.6 degrees each, or in other words a hundredth of a revolution. The shutter M is operated by means of a time-measuring device such as a pendulum N, whose period of complete or double-vibration is set to be exactly equal to the proper time for a complete revolution of the disk $g^4$ with the given load. The stem $n^3$ of the pendulum may be graduated, as at $n^4$, to different settings of the bob $n^5$, corresponding with different meter-constants. The pendulum N acts through a contact-point $n'$ carried thereby and dipping into the mercury cup O at the end of each swing to the left and thereby closing a circuit $n^2$ across the leads $b^1$, $b^2$, which circuit includes an electromagnet P, whose armature $p'$ is mounted on the actuating arm $m'$ of the shutter M. The effect of this arrangement obviously is that at each swing to the left of the pendulum N the circuit $n^2$ is closed and the shutter M is instantaneously opened and closed, disclosing to the observer the momentary position of the spot $g^5$ on the disk $g^4$.

The process of calibration is as follows: The balance J is first adjusted to the load for which the meter G is to be calibrated, say the full load of said meter, and the pendulum N is also adjusted to a period equal to the correct period of rotation of the meter under such load, as above described. The current of the secondary circuit is then adjusted till the beam of the balance J is exactly balanced, this being done by a proper adjustment of the contact-levers $c^6$, $d^6$, and $e^6$, and of the rheostat H; the switch K being thrown to the left as shown in full lines in the drawing. At the beginning of the observations, the disk $g^4$ is checked by the finger until the spot $g^5$ approximately registers with the spot $g^6$ at the opening of the shutter. Supposing now that the meter is one per cent. slow, the disk $g^4$ will, in the proper time for one revolution, complete only ninety-nine one-hundredths of one revolution, and the spot $g^5$ will consequently at each opening of the shutter M occupy a position one-hundredth of a revolution (that is, one division of the scale $g^7$) to the right of that which it occupied at the preceding opening of the shutter; so that, with the repeated opening of the shutter M, the spot $g^5$ will appear to be moving slowly in a direction contrary to that of rotation of the disk. On the other hand, if the meter be fast, the spot $g^5$ will appear to move off in the same direction as the disk on successive openings of the shutter and the apparent movement will be the excess speed of the meter. If desirable the percentage of acceleration or retardation of the meter can be measured at this point, and the accuracy of measurement will be increased in proportion to the number of revolutions which are observed. For example, if the scale $g^7$ be readable only to the smallest division, then the accuracy of measurement is within one per cent. for one revolution, and within one-tenth of one per cent. for ten revolutions. To set the meter correctly, the control magnets are then adjusted till the spot $g^5$ appears to stand completely still, that is, appears at exactly the same point on each successive opening of the shutter, thus indicating that the period of revolution is correct. It is to be observed that, in this operation, both hands of the operator are free to adjust the drag-magnets or meter-coils. After testing and setting the meter for full load (or any other desired load) the switch K is thrown to the right, the autotransformer and rheostat handles again adjusted (if necessary) until the beam of the balance J is level, and the accuracy of the meter G may be tested for one-tenth of the former load, with the same reading on the balance J as before, it being understood that the spot $g^5$ is to be observed at every tenth double-vibration of the pendulum N to indicate a single revolution of the meter disk. This will enable the accuracy of the registration to be tested to one-tenth of one per cent. of the original or full load, that is, to one per cent. of the actual load.

It may be observed that the rheostat H should be one without steps as shown, and permitting continuous variation of the resistance in circuit, so that the exact current necessary to bring the beam to a balance may be passed through the coils $j'$, when the balance-pea is properly set. The rheostat also performs the function of raising the power-factor of the circuit, that is, of bringing the current in the secondary circuit more closely into phase with that of the primary, thus counteracting the dephasing tendency of the autotransformer. The pendulum N is here shown for simplicity's sake without any driving mechanism, but it is to be understood that said pendulum would be ordinarily driven by a clock-train, or in any other manner common to the pendulums of clocks.

The second step of my process is that of standardizing the service-meters from the secondary standard, as is illustrated in Fig. 2. In this part of the process I make use of a transformer Q having a high-tension primary $q'$, connected by leads $q^2$, $q^3$, to the respective mains $B^1$, $B^2$, and its secondary $q^4$, which is of few turns so as to give a large current at low tension, is divided by a plurality of taps $q^6$ into a number of segments to which correspond contact-bosses $q^7$ disposed in a circular manner about the pivot of the contact-lever $q^8$ which is so arranged as to connect any one of the bosses $q^7$ with one pole of the current-circuit R. The lever $q^8$ may be constructed like the lever $e^6$ of Fig. 1, as indicated in the drawing with a pair of contact-fingers $q^9$ and inductance $q^{10}$. Instead of the means for varying the electromotive-force of the current-circuit shown in Fig. 1, a simpler method is here shown. The primary $q'$ of the transformer is tapped at one end by a plurality of taps $q^{11}$ which are brought down to contact-bosses $q^{12}$ disposed for connection with a contact-lever $q^{13}$ connected to the lead $q^3$. In this way the finer adjustment of the current-circuit is provided for.

The secondary standard G is shown as disposed centrally of a group of service-meters A which are to be tested or standardized. One of the terminals of the current-coil of each of the meters A may be permanently connected to one end of the secondary winding of the transformer Q by means of the circuit leads $r'$, as shown, the other ends of said current-coils being brought to the respective contact-bosses $s'$ of a multipolar-switch S, each boss thereof corresponding to the current-coil terminal of one of the meters A.
The circuit R passes from the contact-lever $q^8$ through a continuously variable rheostat T, thence through the current-coils $g'$ of the standard meter G, and thence to the contact-lever $s^2$ of the switch S; whereby the current in the circuit R passes successively through the rheostat T, the current-coil $g'$ of the standard G, and the current-coils $a'$ of one of the service-meters A. Before making the test, the potential coils $a^2$, $g^2$ of all the meters are preferably connected up with the line by means of the leads $b'$, $b^2$, so as to warm up the meters and have them in normal condition when the test is made. Each of the service meters A is provided with a spot or mark $a^3$ upon the disk thereof, and a stationary scale $a^4$ placed adjacent thereto as shown in the drawing, this scale being preferably graduated in hundredths of a circumference each way from a central zero-point as shown. At a convenient distance from the standard G is placed a telescope U or a focusing lamp V, or both, these being directed toward a small mirror $g^8$ placed on the shaft of the meter G. Both the telescope U and the lamp V are focused upon the scale $a^4$ of any one of the service meters A, as indicated by the ray-lines $u'$, it being understood, of course, that a second mirror may be used when necessary to throw the light down in a vertical direction, as where the scale $a^4$ is horizontal, being necessarily so represented in the diagram. It is also desirable to have a cylindrical screen or diaphragm W inclosing the meter G and having openings $w'$ and $w^2$ therein in position to permit the passage of the light-rays between the mirror $g^8$ and the telescope U, lamp V, and scale-disks $a^4$ of the meters A. All but one of these openings $w^2$ may, to avoid confusion, be closed by diaphragms $w^3$ while the meter corresponding to the opening which is left open is being calibrated.

Where the telescope and focusing-lamp are used conjointly, the light from the latter will be thrown instantaneously upon the scale of the meter being tested when the mirror $g^8$ is in the proper angular position to reflect the light from the lamp upon the meter scale. The light so flashed upon the scale will disclose the momentary position of the spot $a^3$ on the meter-disk, which is observed through the telescope U, and the reflection being momentaneous the spot will appear to be standing still at the given point on the scale. On the second revolution of the meter G the same thing will take place, and if the meter under test is correct, the spot $a^3$ will appear at the same point as before, and so on for successive revolutions, whereas, if fast or slow, it will appear to move slowly off to the right or left as observed through the telescope. In this case the rate of acceleration or retardation may be measured, if desired, and the meter set to the right speed by adjusting the control-magnets. As soon as one meter has been tested, the switch-lever $s^2$ is shifted to start up the next meter which is tested in turn, and thus a large number of meters may be successively tested rapidly, and without any change of adjustment of the testing apparatus other than above indicated.

In general a meter can be tested with sufficient accuracy according to this process by a single revolution of the shaft, another revolution having been first allowed the meter to rise from zero to normal velocity. Although more than one spot might be used on the meter-disk for the purpose of testing in less than one revolution, I do not deem this advisable, as the rate of rotation may be slightly different from different parts of the revolution, making the first half, for example, appear longer or shorter than the second half. Where the telescope U alone is used (without the focusing-lamp) the meter-scales will be continuously illuminated, and where the focusing-lamp V is used alone, the position of the spot $a^3$ may be observed directly upon the scale, being kept in substantial darkness, except for the momentary illumination from the lamp V. In place of using the telescope U the eye may be placed directly at this point, above or below the lamp V, and the mirror $g^8$ if slightly concaved will present to the eye directed at the mirror a magnified image of the scale of shorter duration.

In the above manner, the meter A may be adjusted to correct registration at any given load, and the variations from correctness may then be tabulated by testing under any other load. Even where the load-characteristics of the service-meters are the same as the standard by which they are tested (which will be the case if they are of the same type and capacity), it is generally advisable to test them at two loads, one heavy and one light, as casual defects, such as undue friction of bearings, gear-train, etc. cannot otherwise be detected.

In Fig. 3 is shown a somewhat different and simpler method of carrying out the service-meter calibration, and for the sake of illustrating the possibilities of my process I have also shown it in this figure as applied to direct-current systems. The direct-current standard meter is shown at G', and the service-meter being tested at A'. The potential coils (in this case the armatures) 11, 12 of both meters are connected in parallel by leads 13, 14 to the main-conductors 15, 16 of the power circuit; while the current-coils 17, 18 are connected in series in a circuit 19, which is energized by any suitable low-potential source of current, such as a few storage cells 20 (or the current may be derived by well-known methods from the power-circuit), and contains a regulating device, illustrated as a rheostat 21. Instead of the light-reflecting apparatus of Fig. 2 there is provided a branch-circuit X connected across the mains or otherwise electrically energized; this circuit containing the electromagnet Y whose armature $y'$ is secured to the operating-arm $z'$ of a photographic shutter Z disposed in line with the zero of the scale 22 of the meter A', whereby the spot 23 on the disk 24 thereof can be observed in its position relative to such scale during the momentary opening of the shutter. The circuit X is normally open at a pair of terminals $x'$, which may be, if desired, in the form of mercury-cups, which are electrically connected by means of a pair of radial arms $x^2$ on the shaft 25 of the meter G', said arms carrying brushes $x^3$ in position to contact with the terminals $x'$.

The terminals $x'$ should subtend an angle less than 180 degrees at the axis of the meter, and the arms $x^2$ placed at the same angle, whereby the brushes $x^3$ simultaneously contact only once in each revolution with the terminals $x'$, thereby closing the branch-circuit X, and actuating the shutter Z. The position of the spot 23 on the meter-disk is then observed at every opening of the shutter in the same manner as the spot $q^5$ in Fig. 1, and the meter set accordingly.

In testing direct-current meters on light loads it is desirable to compare with the standard meter at full load which avoids errors due to change of load characteristic of this type and insures accurate results. For this purpose I may employ a shunt-resistance 26 inserted in a branch-circuit 27 around the coil 18, with a switch 28 for opening and closing the branch-circuit. The resistance 26 may be only one-ninth of the current-coil 18, whereby on closing the switch 28 the load on the meter A' is reduced to one tenth that on the meter G. In this case the position of the spot 23 is observed only at every tenth opening of the shutter.

It is to be observed that, in all measurements on my system, the operator has both hands free to adjust the meter simultaneously with observation, which is one great advantage of the method.

While some of the features herein described are limited to the use of alternating current, it will be understood that in general the system is applicable to any kind of current, and polyphase connections, for example, can readily be devised by those skilled in the art. I do not consider my invention limited in its form or scope of modification otherwise than may be inferred from the reasonable construction of my claims.

Having thus described my invention, what I claim as new and desire to secure by Letters Patent, is:

1. The process of testing rotary registering meters having a spot or mark upon a rotary element of the meter, which consists in setting the meter in rotation under any desired load, momentarily disclosing to view the angular position of said spot at the expiration of fixed intervals of time, comparing the amount of angular movement thereby found with the proper angular movement for the given load and time, and deducing therefrom the fact of acceleration or retardation of said meter.

2. The process of testing rotary registering meters having a spot or mark upon a rotary part of the meter, which consists in setting the meter in rotation under any desired load, momentarily disclosing to view the angular position of the spot or mark at the expiration of a known interval of time, and so adjusting said meter that the amount of actual rotation so observed shall be equal to the correct amount of angular rotation for the given load and time.

3. The process of testing rotary registering meters having a spot or mark upon a rotating part of such a meter, and having a fixed spot or mark adjacent to the path of said rotating spot or mark, said process consisting in setting said meter in rotation under any desired load, measuring the load under which said meter is operating, momentarily disclosing to view the position of the rotating spot or mark relative to the fixed spot or mark at the end of intervals of time corresponding to the proper period of rotation of said rotating spot or mark, and deducing therefrom the acceleration or retardation of said meter.

4. The process of testing rotary registering meters having a spot or mark upon a rotating part of such a meter and having a fixed spot or mark adjacent to the path of said rotating spot or mark, said process consisting in setting said meter in rotation under any desired load under which said meter is operating, momentarily disclosing to view the position of said rotating spot or mark relative to the fixed spot or mark at the end of intervals of time corresponding to the proper period of rotation of said rotating spot or mark, and adjusting said meter so as to make the rotating spot or mark appear constantly in the same position relative to said fixed spot or mark.

5. The process of testing rotary registering meters having a spot or mark upon a rotating element of such meter, and having a fixed spot or mark adjacent to the path of said rotating spot or mark whereby the angular position of the latter can be observed, said process consisting in setting said meter in rotation under any given load, measuring said load, arranging a photographic shutter in position for the observation of said spot or mark, actuating said shutter to open and close instantaneously at the expiration of intervals of time corresponding to the proper period of rotation of said spot or mark by means of a time-measuring device, and observing through said shutter when opened and closed the momentary successive positions of said rotating spot or mark relative to said fixed spot or mark.

6. An apparatus for testing rotary registering meters comprising, in combination, a spot or mark upon a rotating part of the meter to be tested, a fixed spot or mark arranged to be viewed adjacent to the path thereof whereby its angular position may be measured, means for measuring the load upon said meter during test, and means for momentarily disclosing to view said spots or marks at intervals corresponding to the proper period of rotation of said meter or some multiple or submultiple thereof.

7. An apparatus for testing rotary registering meters comprising, in connection with the meter to be tested, a spot or mark on a rotating element thereof, means for observing its angular position from a fixed spot or mark in fractions of a revolution, a light-shutter through which said spot or mark is observed, means for measuring a load upon said meter during test, and a time-measuring device acting to momentarily open and close said shutter at intervals corresponding to the proper period of rotation of said rotating element for the given load or some multiple or submultiple thereof.

8. An apparatus for testing rotary electric meters, comprising, in connection with a meter to be tested, a spot or mark carried by a rotating element of said meter, means for measuring the angular position of said spot or mark from a fixed zero-point, a standard load-measuring device arranged in circuit with said meter to measure the load, a light-shutter arranged in position to observe the position of said spot or mark therethrough, an electromagnetic device for operating said shutter, an electric circuit to energize said electromagnetic device, a circuit-closing device for making and breaking said circuit, and a time-measuring device adapted to operate said circuit-closer to close said circuit at regular intervals of time corresponding to the proper period of rotation of said spot or mark, whereby said shutter is momentarily opened and closed.

9. An apparatus for testing alternating-current rotary electric meters comprising, in connection with one of said meters to be tested, a standard load-measuring device, an electric current circuit carrying the load to be measured and containing said load-measuring device, a transformer whose primary is in circuit with said load-measuring device and whose secondary is in circuit with said meter, said transformer having a transformation ratio such as to give a secondary current equal to a multiple or submultiple of the primary current, a spot or mark on rotating element of said meter, means for measuring the angular position of said spot or mark from a fixed zero-point, and means for disclosing momentarily to view the successive positions of said spot or mark at intervals of time corresponding to the proper period of rotation of said rotating-element or some multiple or submultiple thereof.

10. An apparatus for testing alternating current rotary wattmeters, the same comprising, in connection with one of said meters to be tested, a spot or mark on a rotating element thereof, a fixed spot or mark with relation to which the position of said rotating spot or mark is observed, means for momentarily disclosing to view the positions of said fixed and rotating spots or marks at intervals corresponding to the proper period of revolution of the latter or some multiple or submultiple thereof, a standard watt-measuring device, an electric power-circuit to be measured, the potential coils of said meter and of said watt-measuring device being connected across the poles of said circuit, an electric current-circuit derived therefrom, said current-circuit containing regulating means and the current coils of said watt-measuring device, a double-pole changeover switch, a secondary current-circuit in which the current-coils of said meter to be tested are included, and a secondary transformer; the poles of said two current-circuits and said transformer being so connected with said switch that when said switch is in one position the two current-circuits are in series and said transformer is out of action and when said switch is in the opposite position said two current-circuits are separated and one includes the primary of said transformer and the other the secondary of said transformer.

In witness whereof, I have hereunto set my hand.

EDGAR M. WILKINS. [L. S.]

In presence of—
H. G. FENTON,
MANUEL LEDUC.